June 11, 1935.  H. BANY  2,004,776

AUTOMATIC CONTROL EQUIPMENT

Filed May 26, 1934  2 Sheets-Sheet 1

Inventor:
Herman Bany,
by Harry E. Dunham
His Attorney.

June 11, 1935.  H. BANY  2,004,776
AUTOMATIC CONTROL EQUIPMENT
Filed May 26, 1934   2 Sheets-Sheet 2

Inventor:
Herman Bany,
by Harry E. Dunham
His Attorney.

Patented June 11, 1935

2,004,776

UNITED STATES PATENT OFFICE 2,004,776

AUTOMATIC CONTROL EQUIPMENT

Herman Bany, Lansdowne, Pa., assignor to General Electric Company, a corporation of New York Application May 26, 1934, Serial No. 727,708

12 Claims. (Cl. 171—118)

My invention relates to automatic control equipments and particularly to automatic control equipments for automatically synchronizing a synchronous machine with the alternating current circuit to which it is to be connected and the object of my invention is to provide an improved automatic synchronizing arrangement for accomplishing this result.

My invention is particularly applicable to a system for synchronizing a synchronous frequency converter which is adapted to be connected between two alternating current circuits of different frequencies, which circuits are tied together in any well known manner so that the frequency relation between them is definitely maintained. In accordance with my invention, I first synchronize one of the synchronous machines constituting the frequency converter, preferably the machine connected to the circuit having the lower frequency, and then automatically control the excitation of one of the machines and the adjustment of the stator of one of the machines relative to the rotor thereof so that the disconnected machine of the converter is brought into synchronism with the circuit to which it is to be connected, before it is connected thereto.

My invention will be better understood from the following description when taken in connection with the accompanying drawings and its scope will be pointed out in the appended claims.

Figure 1:
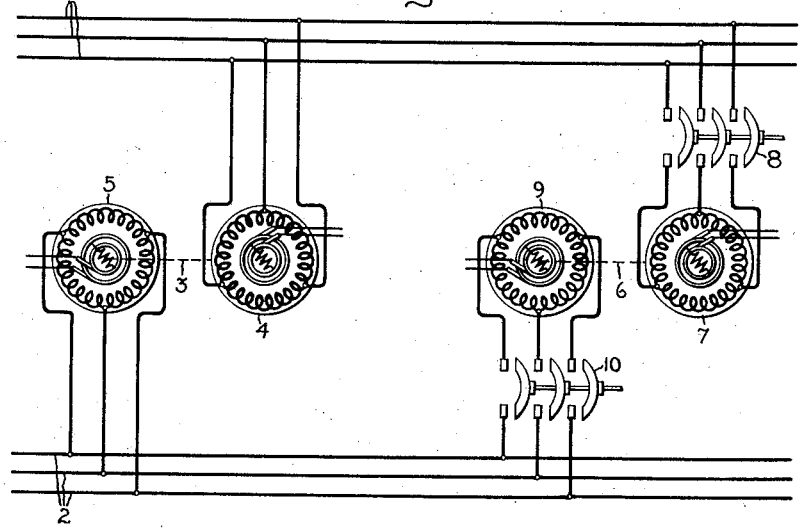
Figure 3:
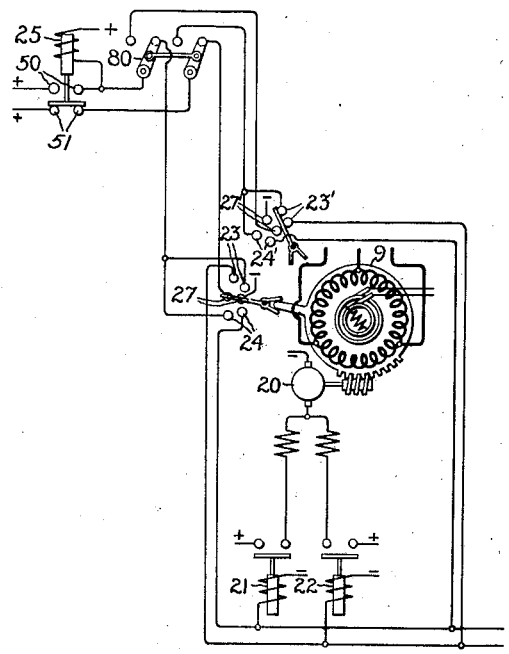
Figure 2:
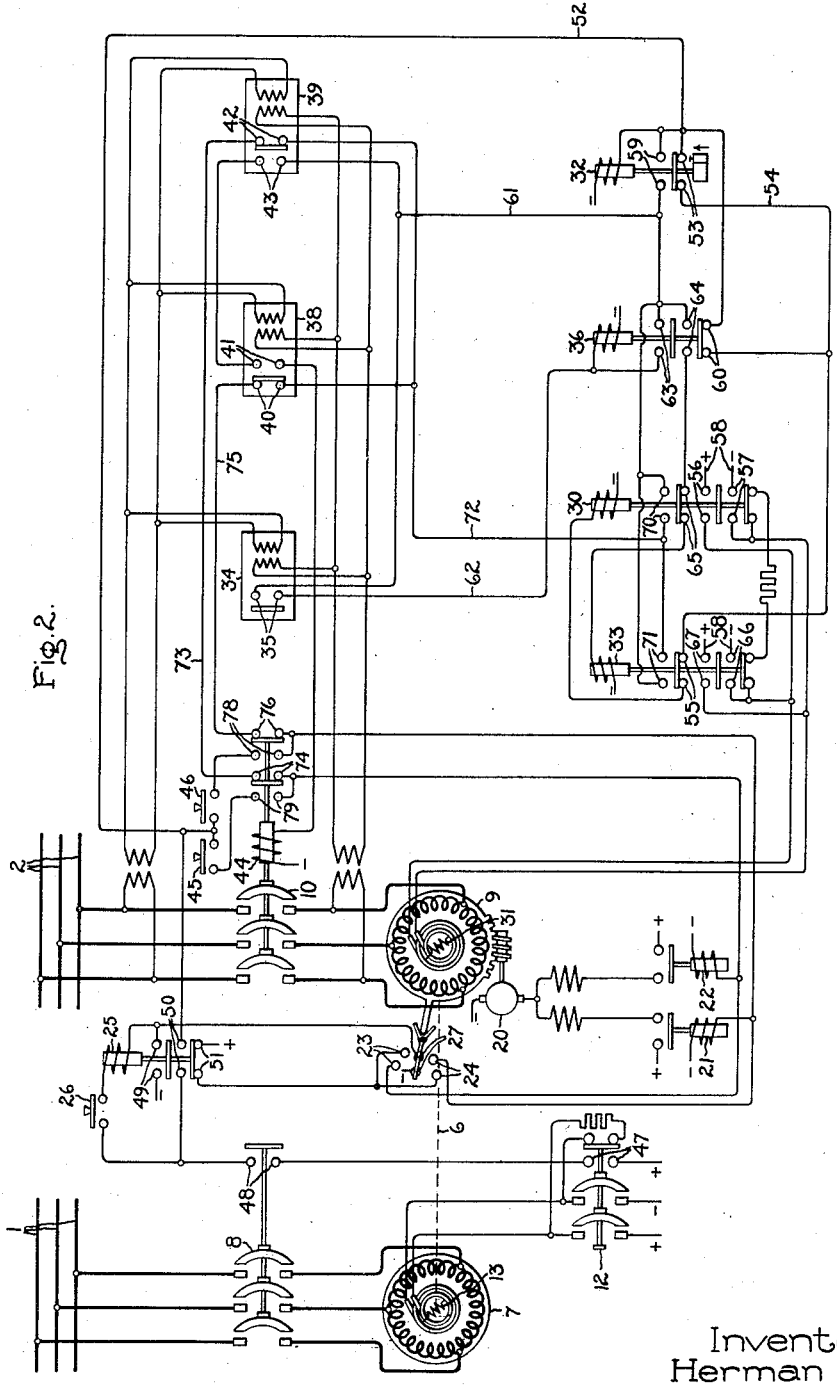

In the accompanying drawings, Fig. 1 shows diagrammatically a system of distribution to which my invention is particularly applicable; Fig. 2 shows diagrammatically an automatic control equipment for synchronizing one of the machines of a frequency converter; and Fig. 3 shows a modification of a portion of the control system shown in Fig. 2.

Referring to Fig. 1, 1 and 2 represent two alternating current circuits of different frequencies which are connected together by a suitable synchronous frequency converter 3 comprising a synchronous motor 4 connected to the circuit 1 and driving a synchronous generator 5 which is connected to the circuit 2. 6 represents another synchronous frequency converter comprising a synchronous motor 7 which is adapted to be connected to the circuit 1 by means of a suitable switch 8 and a synchronous generator 9 which is adapted to be connected to the circuit 2 by means of a suitable switch 10.

In accordance with my invention, I provide an improved control arrangement for connecting the converter 6 in parallel with the converter 3. I first start the converter 6 and synchronize one of the machines thereof, preferably the lower frequency machine, with its respective circuit so that the converter runs in synchronism therewith. I then automatically adjust the stator of one of the machines of the converter relative to the foundation therefor so as to establish a predetermined phase relation between the voltages of the disconnected machine, the field of which is excited, and of the other circuit and when a predetermined phase relation is established, I automatically connect the disconnected machine to its respective circuit. Thereafter the adjustable stator is controlled in any suitable manner to control the division of load between the converters 3 and 6.

Referring to Fig. 2, which diagrammatically illustrates a control arrangement for controlling the converter 6 in accordance with my invention, I have assumed that the circuit 1 has the lower frequency and that the stator of the machine 9 is adjustable. As shown, the converter 6 is started by connecting the lower frequency machine 7 directly to the circuit 1 so that the machine 7 starts as an induction motor and when it approaches its synchronous speed a suitable field switch 12 is closed in any suitable manner to effect the energization of the field winding 13 to pull the machine 7 into synchronism with the circuit 1. While I have shown the switches 8 and 12 as being manually controlled in order to simplify the disclosure, it is obvious that any suitable automatic control, examples of which are well known in the art, may be provided for effecting the operation of these switches. Also it is obvious that so far as my invention is concerned any other well known starting and synchronizing arrangement for a synchronous machine may be employed for starting and synchronizing the machine 7.

After the lower frequency machine 7 has been synchronized, I provide means for automatically adjusting the stator of the machine 9 so that the stator magnetic poles thereof have the proper space relationship with respect to the rotor magnetic poles thereof to effect the proper parallel operation of the converters 3 and 6. It is evident that if the source of excitation for the machine 7 is always of the same polarity, there is a possibility of the machine 7 pulling into synchronism with the rotor of the converter 6 in as many different positions relative to the stator poles of the machines as there are pairs of poles on the machine 7. For example, assume that the frequencies of the circuits 1 and 2 are 25 and 60 cycles respectively and that the machines 7 and 9 have 10 and 24 poles respectively. The machine 7 may then pull into synchronism with the rotor in any one of five different positions and in only one of these five positions are the rotor poles of the machine 9 in the proper position relative to the stator poles thereof. By adjusting the stator of one of the machines of the converter 6, which in Fig. 2 I have shown to be the stator of the machine 9, I am able to restore the proper relationship between the poles of the machine 9 after the machine 7 has been synchronized in order to effect the proper parallel operation of the converters 3 and 6.

As shown in Fig. 2, the stator of the machine 9 is arranged to be rotated by a reversible motor 20, the circuits of which are controlled by the auxiliary relays 21 and 22 so that when the relay 21 is energized the stator of the machine 9 is rotated in one direction and when the relay 22 is energized the stator is rotated in the opposite direction. Associated with the rotatable stator of the machine 9 are suitable contacts 23, 24 and 27 which are controlled by the position of the stator so that when it is in its normal position the contacts 27 are closed, when it is moved in one direction from its normal position, the contacts 27 are maintained open and the contacts 23 are maintained closed until the stator is restored to the normal position and, when the stator is moved in the opposite direction from its normal position, the contacts 27 are maintained open and the contacts 24 are maintained closed until the stator is restored to its normal position. The contacts 23 control a circuit for the relay 22 which, in turn, controls the circuit of the motor 20 so as to restore the stator to its normal position in case the contacts 23 are closed when the converter 6 is shut down. The contacts 24 complete a similar circuit for the relay 21 to effect the operation of the motor 20 to restore the stator to its normal position in case the contacts 24 are closed when the converter 6 is shut down.

For effecting the automatic operation of the stator adjusting means so as to produce the proper space relationship between the stator and rotor magnetic poles of the machine 9, I have provided in the arrangement shown in Fig. 2 a master relay 25 which is arranged to be energized in response to the operation of a suitable control device, such as a hand switch 26, after the machine 7 has been synchronized. The original energizing circuit of the master relay 25 includes contacts 27 which are controlled by the position of the stator of the machine 9 so that the relay 25 can be energized to initiate the operation of the automatic stator adjusting means only in case the stator is in its normal position.

The operation of the relay 25 effects the operation of a field switch 30 which connects the field winding 31 of the machine 9 to a source of excitation so that direct current flows through the field winding 31 in a predetermined direction. Also the operation of the relay 25 effects the operation of a time relay 32 which, after a predetermined time, effects the opening of the field switch 30 and the closing of another field switch 33 if the phase difference between the voltage of the circuit 2 and the voltage of the machine 9, as a result of the closing of the field switch 30, is greater than 90°. This result is accomplished by providing a suitable phase responsive relay 34 which is connected to the armature circuit of the machine 9 and to the circuit 2 in any suitable manner, examples of which are well known in the art, so that it closes its contacts 35 and effects the operation of an auxiliary relay 36 in case the phase difference between corresponding phase voltages of the machine 9 and the circuit 2 exceeds 90°. The contacts of the auxiliary relay 36 and the time relay 32 are so interconnected that if the relay 36 is deenergized after the time relay has been energized for a predetermined time, the field switch 30 remains closed whereas if the relay 36 is energized when the relay 32 operates after it has been energized a predetermined time, the field switch 30 is opened and the field switch 33 is closed to reverse the field excitation of the machine 9. In this manner I limit the travel range over which the stator of the machine 9 has to be adjusted to an angular displacement of 90 electrical degrees of the machine 9 in each direction from the normal position of the stator plus the amount of the load angle which has a maximum value of 90 electrical degrees. Therefore, it will be seen that the total range over which the stator has to be adjusted does not exceed 270 electrical degrees of the higher frequency machine 9. Furthermore, it will be observed that by first starting and synchronizing the lower frequency machine the total number of mechanical degrees that the stator of the higher frequency machine has to be shifted in order to effect a 270 electrical degree shift is much smaller than the number of mechanical degrees the lower frequency machine stator would have to be shifted to effect the same number of electrical degree shift if the converter were started by first starting and synchronizing the higher frequency machine.

After it has been automatically determined which field switch should remain closed, the stator shifting motor 20 is then operated to shift the stator of the machine 9 so as to establish a predetermined phase relation, preferably substantially zero phase difference, between the voltages of the machine 9 and the circuit 2. This result is accomplished by means of the phase responsive relays 38 and 39 which are arranged selectively to control the relays 21 and 22 in accordance with the phase relation between predetermined voltages of the machine 9 and the circuit 2. The relay 38 is connected to the armature circuit of the machine 9 and to the circuit 2 in any suitable manner, examples of which are well known in the art, so that it maintains its contacts 40 closed and its contacts 41 open, when the relay is deenergized and when the machine voltage lags the voltage of the circuit 2 and maintains its contacts 41 closed and its contacts 40 open, when the voltages of the machine 9 and the circuit 2 are substantially in phase and when the machine voltage leads the voltage of the circuit 2. The contacts 40 of the relay 38 control the circuits of the motor 20 so that the stator of the machine 9 is rotated in a direction to decrease the lag of the voltage of the machine 9 when the contacts 40 are closed.

The relay 39 is connected to the armature circuit of the machine 9 and to the circuit 2 in a similar manner so that it maintains it contacts 42 closed and its contacts 43 open when the voltage of the machine 9 leads the voltage of the circuit 2 and when the relay 39 is deenergized and maintains its contacts 42 open and its contacts 43 closed when the voltages of the machine 9 and the circuit 2 are substantially in phase and when the machine voltage lags the voltage of the circuit 2. The contacts 42 of the relay 39 control the circuit of the stator shifting motor 20 so that the stator of the machine 9 is rotated in the proper direction to decrease the lead of the machine voltage when the contacts 42 are closed.

As soon as the stator of the machine 9 has been shifted sufficiently to bring the voltages of the machine 9 and the circuit 2 substantially into phase so that the contacts 41 and 43 of the relays 38 and 39 respectively are simultaneously closed, a circuit is completed for the closing coil 44 of the switch 10 to effect the closing of this switch so that the machine 9 is connected to the circuit 2. The closing of the switch 10 also removes the stator adjusting means from the control of the relays 38 and 39 and transfers the control to suitable means, examples of which are well known in the art, such as the manually controlled switches 45 and 46 whereby the amount of load carried by the converter 6 may then be adjusted at will.

The operation of the arrangement shown in Fig. 2 is as follows: When the converter 6 is shut down, the various control devices are in the position shown in the drawings. It will be observed that if the position of the stator of the machine 9 were such that while the machine is shut down the contacts 24 were closed, a circuit would be completed through the contacts 51 of the deenergized master relay 25 and the contacts 24 for the control relay 21 so that the stator adjusting motor 20 would be energized to restore the stator to its normal position. Similarly, if the position of the stator of the machine 9 were such that the contacts 23 were closed when the machine was shut down, a circuit would be completed for the control relay 22 to effect the operation of the motor 20 so as to restore the stator to its normal position.

When it is desired to place the converter 6 in operation in parallel with the converter 3 of Fig. 1, the switch 8 is first closed to start the machine 9 as an induction motor and then when the machine approaches its synchronous speed, the field switch 12 is closed to cause the machine 7 to pull into synchronism with the circuit 1. If the switch 26 is then closed, an energizing circuit is completed for the master relay 25 to effect the operation of the automatic control means associated with the machine 9. This energizing circuit is from one side of a suitable control circuit through the contacts 47 on the field switch 12, contacts 48 on the switch 8, contacts of switch 26, winding of relay 25, contacts 27 associated with the stator of the machine 9 to the other side of the control circuit. By closing its contacts 49, the relay 25 completes a locking circuit for itself which is independent of the contacts 27 so that the subsequent opening of these contacts when the stator is moved from its normal position does not effect the deenergization of the master relay 25. By closing its contacts 50 the relay 25 completes an energizing circuit for the operating coil of the field switch 30. This circuit is from one side of the control circuit through contacts 47 of the field switch 12, contacts 48 of the switch 8, contacts 50 of the relay 25, conductor 52, contacts 53 of time relay 32, conductor 54, contacts 55 of field switch 33, operating coil of field switch 30 to the other side of the control circuit. By closing its contacts 56 and 57 the field switch 30 connects the field winding 31 of the machine 9 to a suitable source of excitation 58 so that current flows through the field winding in a predetermined direction. At the same time the circuit for the operating coil of field switch 30 is completed, another circuit is completed from the conductor 52 through the operating winding of the time relay 32 to the other side of the control circuit. After the operating coil of the relay 32 has been energized for a predetermined time, the relay 32 opens its contacts 53 and closes its contacts 59.

If as a result of the closing of the field switch 30 the voltage of the machine 9 is not more than 90° out of phase with the voltage of the circuit 2, the relay 34 maintains its contacts 35 open so that the auxiliary relay 36 remains deenergized. Therefore, when the time relay 32 opens its contacts 53 in the circuit of the operating coil of the field switch 30, this operating coil is not deenergized because the relay 36 in its deenergized position completes through its contacts 60 a shunt circuit around the contacts 53 of the relay 32. However, if the phase difference between the voltage of the machine 9 and the voltage of the circuit 2 does exceed 90° when the field switch 30 is closed, the relay 34 by closing its contacts 35 prepares a circuit for the operating coil of the relay 36 so that this relay 36 is energized when the time relay 32 closes its contacts 59. The energizing circuit of the relay 36 is from one side of the control circuit, through contacts 47 of the field switch 12, contacts 48 of the switch 8, contacts 50 of the relay 25, conductor 52, contacts 59 of the relay 32, conductor 61, contacts 35 of the relay 34, conductor 62, winding of relay 36 to the other side of the control circuit. By closing its contacts 63, the relay 36 completes a locking circuit for itself which is independent of the contacts 35 of the relay 34 so that the relay 36 remains energized independently of the contacts 35. By opening its contacts 60, the relay 36 opens the circuit of the coil of the field switch 30. By closing its contacts 64 the relay 36 completes a circuit for the coil of the field switch 33, this circuit also including the contacts 65 of the field switch 30 when it is in its open position. By closing its contacts 66 and 67, the field switch 30 connects the source of excitation 58 to the field winding 31 of the machine 9 so that the excitation of the machine 9 is reversed. By reversing the excitation in this manner, the phase difference between the voltages of the machine 9 and the circuit 2 is decreased to a value less than 90° and, therefore, the relay 34 opens its contacts 35 but, as pointed out above, the relay 36 remains energized to maintain the coil of the field switch 33 energized.

After the proper field switch has been closed, the stator adjusting motor 20 is operated to adjust the stator of the machine 9 so as to bring the voltage of the machine 9 substantially into phase with the voltage of the circuit 2. If the voltage of the machine 9 is leading the circuit voltage, the relay 39 maintains its contacts 42 closed so that a circuit is completed for the relay 22 to effect the operation of the motor 20 in a direction to decrease the lead of the voltage of the machine 9. This circuit for the relay 22 is from one side of the control circuit through the contacts 47 of the switch 12, contacts 48 of the switch 8, contacts 50 of relay 25, conductor 52, contacts 59 of relay 32, conductor 61, contacts 70 of field switch 30 or contacts 71 of field switch 33 (depending upon which one is closed), conductor 72, contacts 42 of relay 39, conductor 73, auxiliary contacts 74 on switch 10, winding of relay 22 to the other side of the control circuit. As soon as the voltages of the machine 9 and of the circuit 2 are substantially in phase, the above-traced circuit of the relay 22 is opened by the relay 39 opening its contacts 42 and closing its contacts 43.

If the voltage of the machine 9 lags the voltage of the circuit 2, the relay 38 maintains its contacts 40 closed and the contacts 42 and 43 of the relay 39 are respectively open and closed. In that case a circuit is completed for the relay 21 which effects the operation of the stator adjusting motor 20 so as to shift the stator in the opposite direction until the voltages of the machine 9 and the circuit 2 are substantially in phase. This circuit of the control relay 21 is from one side of the control circuit through contacts 47 of the switch 12, contacts 48 of the switch 8, contacts 50 of the relay 25, conductor 52, contacts 59 of relay 32, conductor 61, contacts 70 of field switch 30, contacts 71 of field switch 33 (depending upon which one is closed), conductor 72, contacts 40 of relay 38, conductor 75, auxiliary contacts 76 on switch 10, winding of relay 21 to the other side of the control circuit.

As soon as the voltages of the machine 9 and the circuit 2 are substantially in phase so that the contacts 41 and 43 of the relays 38 and 39 respectively are simultaneously closed, a circuit is completed for the closing coil 44 of the switch 10 to effect the closing of this switch so that the machine 9 is connected directly to the circuit 2. The circuit of the closing coil 44 is from one side of the control circuit through contacts 47 of the switch 12, contacts 48 of the switch 8, contacts 50 of relay 25, conductor 52, contacts 59 of relay 32, conductor 61, contacts 43 of relay 39, contacts 41 of relay 38, closing coil 44 of switch 10 to the other side of the control circuit.

In addition to connecting the machine 9 to the circuit 2, the switch 10 by opening its auxiliary contacts 74 and 76 removes the control of the relays 21 and 22 from the phase responsive relays 38 and 39 and places them under the control of the control switches 46 and 45, respectively, by closing its auxiliary contacts 78 and 79. Therefore, after the converter 6 is connected in parallel with the converter 3, the division of load between the converters may be varied at will by selectively operating the control switches 45 and 46 in any desired manner.

The arrangement shown in Fig. 2 is suitable for one direction of power transfer between the circuits 1 and 2. In case it is desired also to transfer power in the other direction through the converter 6 it is evident that, due to the load angle being in the opposite direction, the normal position of the converter should be different at the time the converter is started in order to limit the range of movement of the stator of the machine 9. Therefore, in Fig. 3 I have shown a modification of a portion of the control systems shown in Fig. 2 whereby the normal position of the stator of the machine 9 may be changed. In Fig. 3 I have provided a two-position manually operated control switch 80 which, in its right-hand position, connects the contacts 50 and 51 of relay 25, the stator position contacts 23, 24 and 27 and the coils of the relays 21 and 22 in the same manner as they are connected in Fig. 2. Therefore, when the switch 80 is in its right-hand position, the stator of the machine 9 is restored to the same normal position as in Fig. 2. When the switch 80 is moved to its left-hand position, the contacts 50 and 51 of the relay 25 and the coils of relays 21 and 22 are connected to another set of stator positioned contacts 23', 24' and 27' which are so located that when the converter is shut down, the stator is restored to a different normal position and the relay 25 can be energized only when the stator is in this new normal position. Since the contacts 23', 24' and 27' are connected to the coils of the relays 21 and 22 and to the contacts 50 and 51 of the relay 25 in substantially the same manner as the contacts 23, 24 and 27, it is believed that a detail description of these connections is unnecessary in order to understand the operation.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, an alternating current circuit, a synchronous machine disconnected from said circuit, means for driving said machine at approximately synchronous speed, means for rotating the stator of said machine relative to the rotor thereof, and means controlled by the phase relation between the voltages of said circuit and machine for controlling the operation of said stator rotating means and the connection of said machine to said circuit.

2. In combination, two alternating current circuits of different frequencies, a frequency converter comprising a dynamo-electric machine connected to one of said circuits and a synchronous machine driven by said first mentioned machine, means for rotating the stator of one of said machines relative to the rotor thereof, and means controlled by a predetermined relation between the voltages of the synchronous machine and the other of said circuits for controlling the operation of said stator rotating means.

3. In combination, two alternating current circuits of different frequencies, a frequency converter comprising a dynamo-electric machine connected to the circuit having the lower frequency and a synchronous machine driven by said connected machine, means for rotating the stator of one of said machines relative to the rotor thereof, and means controlled by the phase relation between the voltages of the synchronous machine and the circuit having the higher frequency for controlling the operation of said stator rotating means.

4. In combination, two alternating current circuits of different frequencies, a frequency converter comprising a dynamo-electric machine connected to the circuit having the lower frequency and a synchronous machine driven by said connected machine, means for rotating the stator of one of said machines relative to the rotor thereof, and means controlled by the phase relation between the voltages of the synchronous machine and the circuit having the higher frequency for controlling the operation of said stator rotating means and the connection of said synchronous machine to the circuit having the higher frequency.

5. In combination, two alternating current circuits of different frequencies, a frequency converter comprising a synchronous machine connected to the circuit having the lower frequency and driving a second synchronous machine, means for rotating the stator of one of said machines relative to the rotor thereof, and means controlled by the phase relation between the voltages of said second machine and the circuit having the higher frequency for effecting a predetermined phase relation between said voltages and for effecting the connection of said second machine to the circuit having the higher frequency when said predetermined phase relation is established.

6. In combination, two alternating current circuits of different frequencies, a frequency converter comprising a synchronous machine connected to one of said circuits and a second synchronous machine connected to the other circuit, means for shifting the stator of one of said machines relative to the foundation therefor, and means for effecting the operation of said shifting means to move said stator to a predetermined position when said converter is disconnected from both of said circuits.

7. In combination, two alternating current circuits of different frequencies, a frequency converter comprising a synchronous machine connected to one of said circuits and driving a second synchronous machine, means for shifting the stator of one of said machines relative to the foundation therefor, means for effecting the operation of said shifting means to move said stator to a predetermined position when said converter is disconnected from both of said circuits, means operative when said first mentioned synchronous machine is connected to said one of said circuits for controlling the operation of said shifting means in accordance with the phase relation between the voltages of said second machine and the other of said circuits, and means responsive to a predetermined phase relation between said voltages for effecting the connection of said second machine to said other circuit.

8. In combination, two alternating current circuits of different frequencies, a frequency converter comprising two synchronous machines having their rotors mechanically connected together, means for shifting the stator of one of said machines relative to the foundation therefor, means for effecting the operation of said shifting means to move said stator to a predetermined position when said converter is disconnected from both of said circuits, means for effecting the starting of said converter from rest and the synchronization of one of said machines with one of said circuits, means operative after said one of said machines has been synchronized to excite the other machine, means responsive to a predetermined phase relation between the voltages of said other machine and the other of said circuits for reversing the excitation of said other machine, means controlled by the phase relation between said voltages for controlling the operation of said shifting means to establish a second predetermined relation between said voltages, and means responsive to said second predetermined relation between said voltages for effecting the connection of said other machine to said other circuit.

9. In combination, two alternating current circuits of different frequencies, a frequency converter comprising two synchronous machines having their rotors mechanically connected together, means for shifting the stator of one of said machines relative to the foundation therefor, means for effecting the operation of said shifting means to move said stator to a predetermined position when said converter is disconnected from both of said circuits, means for effecting the starting of said converter from rest and the synchronization of one of said machines with the circuit having the lower frequency, means operative after said one of said machines has been synchronized to excite the field of the other machine of said converter, means for reversing the excitation of said other machine if the phase difference between predetermined voltages of said other machine and the circuit having the higher frequency exceeds a predetermined amount in response to said excitation of the field of said other machine, means controlled by the phase relation between predetermined voltages of said other machine and said circuit having the higher frequency for controlling the operation of said shifting means to establish a predetermined relation between said last mentioned voltages, and means responsive to said predetermined relation between said last mentioned voltages for effecting the connection of said other machine to the circuit having the higher frequency.

10. In combination, an alternating current circuit, a synchronous machine disconnected from said circuit, means for driving said machine at approximately synchronous speed, means for rotating the stator of said machine relative to the rotor thereof, means controlled by the phase relation between the voltages of said circuit and machine for controlling the operation of said stator rotating means and the connection of said machine to said circuit, and means responsive to the connection of said machine to said circuit for removing said stator rotating means from the control of said voltage controlled means.

11. In combination, two alternating current circuits of different frequencies, a frequency converter comprising a dynamo-electric machine connected to the circuit having the lower frequency and a synchronous machine driven by said connected machine, means for rotating the stator of one of said machines relative to the rotor thereof, means controlled by the phase relation between the voltages of the synchronous machine and the circuit having the higher frequency for controlling the operation of said stator rotating means and the connection of said synchronous machine to the circuit having the higher frequency, and means responsive to the connection of said synchronous machine to the circuit having the higher frequency for removing the control of said stator rotating means from said voltage controlled means.

12. In combination, two alternating current circuits of different frequencies, a frequency converter comprising two synchronous machines having their rotors mechanically connected together, means for shifting the stator of one of said machines relative to the foundation therefor, means for effecting the operation of said shifting means to move said stator to a predetermined position when said converter is disconnected from both of said circuits, means for effecting the starting of said converter from rest and the synchronization of one of said machines with the circuit having the lower frequency, means operative after said one of said machines has been synchronized to excite the field of the other machine of said converter, means for reversing the excitation of said other machine if the phase difference between predetermined voltages of said other machine and the circuit having the higher frequency exceeds a predetermined amount in response to said excitation of the field of said other machine, means controlled by the phase relation between predetermined voltages of said other machine and said circuit having the higher frequency for controlling the operation of said shifting means to establish a predetermined relation between said last mentioned voltages, means responsive to said predetermined relation between said last mentioned voltages for effecting the connection of said other machine to the circuit having the higher frequency, and means responsive to the connection of said other machine to the circuit having the higher frequency for removing the control of said stator shifting means from the voltage controlled means therefor.

HERMAN BANY.